United States Patent
Dobbelaar et al.

(10) Patent No.: US 6,694,514 B1
(45) Date of Patent: Feb. 17, 2004

(54) METHOD AND DEVICE FOR ON-SCREEN DISPLAY OF PROGRAM INFORMATION AND MEANS COMPRISING CODE FOR PERFORMING SUCH A METHOD

(75) Inventors: Astrid Mathilda Ferdinanda Dobbelaar, Eindhoven (NL); Petrus Gerardus Meuleman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 688 days.

(21) Appl. No.: 09/584,813

(22) Filed: May 31, 2000

(30) Foreign Application Priority Data

Jun. 1, 1999 (EP) .............................................. 99201739

(51) Int. Cl.$^7$ ................................................. G06F 3/00
(52) U.S. Cl. ............................. 725/47; 725/44; 725/52; 725/61; 348/563; 348/564
(58) Field of Search .................................. 345/672–685; 348/569, 553, 563; 725/44–45, 47, 52, 53

(56) References Cited

U.S. PATENT DOCUMENTS

| | | | | |
|---|---|---|---|---|
| 5,479,268 A | | 12/1995 | Young et al. ................ | 358/335 |
| 6,018,372 A | * | 1/2000 | Etheredge ..................... | 725/44 |
| 6,128,009 A | * | 10/2000 | Ohkura et al. ................ | 725/46 |
| 6,337,715 B1 | * | 1/2002 | Inagaki et al. ............... | 348/553 |
| 6,421,828 B1 | * | 7/2002 | Wakisaka et al. ............. | 725/52 |
| 6,486,920 B2 | * | 11/2002 | Arai et al. ................... | 348/563 |

* cited by examiner

*Primary Examiner*—Chris Grant
*Assistant Examiner*—Hai V. Tran
(74) *Attorney, Agent, or Firm*—Edward W. Goodman

(57) ABSTRACT

A plurality of programs is displayed on screen in a grid of cells. When program in a particular column of cells is pointed to by a cursor, the programs in neighboring columns are shifted to improve the time-alignment of the programs in the row of the cursor.

7 Claims, 2 Drawing Sheets

| NOW | ARD | ZDF | NED1 | BBC1 | BBC2 |
|---|---|---|---|---|---|
| | A1 Popmusic<br>17.00-17.50 | B1 Game<br>17.30-18.00 | C1 Actualities<br>16.30-18.00 | D1 Soap<br>16.45-17.30 | E1 Movie<br>15.30-17.40 |
| | A2 Opera<br>17.50-19.50 | B2 C Quiz<br>18.00-18.30 | C2 News<br>18.00-18.15 | D2 Talkshow<br>17.30-18.15 | E2 News<br>17.40-18.05 |
| | A3 Discussion<br>19.50-20.50 | B3 Soap<br>18.30-19.15 | C3 Comm.<br>18.15-18.25 | D3 Quiz<br>18.15-19.00 | E3 Stock ex.<br>18.05-18.15 |
| | A4 News<br>20.50-21.00 | B4 Stock ex.<br>19.15-19.45 | C4 Thriller<br>18.25-19.30 | D4 Comedy<br>19.00-20.45 | E4 Weather<br>18.15-18.25 |
| | A5 Comm.<br>21.00-21.15 | B5 News<br>19.45-20.15 | C5 Movie<br>19.30-21.30 | D5 Show<br>20.45-22.00 | E5 Drama<br>18.25-21.00 |

G

| NOW | ARD | ZDF | NED1 | BBC1 | BBC2 |
|---|---|---|---|---|---|
| | A0 Comedy<br>16.00-17.00 | B1 Game<br>17.30-18.00 | C2 News<br>18.00-18.15 | D1 Soap<br>16.45-17.30 | E3 Stock ex.<br>18.05-18.15 |
| | A1 Popmusic<br>17.00-17.50 | B2 Quiz<br>18.00-18.30 | C3 Comm.<br>18.15-18.25 | D2 Talkshow<br>17.30-18.15 | E4 Weather<br>18.15-18.25 |
| | A2 Opera<br>17.50-19.50 | B3 C Soap<br>18.30-19.15 | C4 Thriller<br>18.25-19.30 | D3 Quiz<br>18.15-19.00 | E5 Drama<br>18.25-21.00 |
| | A3 Discussion<br>19.50-20.50 | B4 Stock ex.<br>19.15-19.45 | C5 Movie<br>19.30-21.30 | D4 Comedy<br>19.00-20.45 | E6 Soap<br>21.00-22.15 |
| | A4 News<br>20.50-21.00 | B5 News<br>19.45-20.15 | C6 Talkshow<br>21.30-22.30 | D5 Show<br>20.45-22.00 | E7 Popmusic<br>22.15-23.00 |

G

| NOW | ARD | ZDF | NED1 | BBC1 | BBC2 |
|---|---|---|---|---|---|
| | A1 Popmusic 17.00-17.50 | B1 Game 17.30-18.00 | C1 Actualities 16.30-18.00 | D1 Soap 16.45-17.30 | E1 Movie 15.30-17.40 |
| | A2 Opera 17.50-19.50 | B2 C Quiz 18.00-18.30 | C2 News 18.00-18.15 | D2 Talkshow 17.30-18.15 | E2 News 17.40-18.05 |
| | A3 Discussion 19.50-20.50 | B3 Soap 18.30-19.15 | C3 Comm. 18.15-18.25 | D3 Quiz 18.15-19.00 | E3 Stock ex. 18.05-18.15 |
| | A4 News 20.50-21.00 | B4 Stock ex. 19.15-19.45 | C4 Thriller 18.25-19.30 | D4 Comedy 19.00-20.45 | E4 Weather 18.15-18.25 |
| | A5 Comm. 21.00-21.15 | B5 News 19.45-20.15 | C5 Movie 19.30-21.30 | D5 Show 20.45-22.00 | E5 Drama 18.25-21.00 |

FIG. 1a

| NOW | ARD | ZDF | NED1 | BBC1 | BBC2 |
|---|---|---|---|---|---|
| | A0 Comedy 16.00-17.00 | B1 Game 17.30-18.00 | C2 News 18.00-18.15 | D1 Soap 16.45-17.30 | E3 Stock ex. 18.05-18.15 |
| | A1 Popmusic 17.00-17.50 | B2 Quiz 18.00-18.30 | C3 Comm. 18.15-18.25 | D2 Talkshow 17.30-18.15 | E4 Weather 18.15-18.25 |
| | A2 Opera 17.50-19.50 | B3 C Soap 18.30-19.15 | C4 Thriller 18.25-19.30 | D3 Quiz 18.15-19.00 | E5 Drama 18.25-21.00 |
| | A3 Discussion 19.50-20.50 | B4 Stock ex. 19.15-19.45 | C5 Movie 19.30-21.30 | D4 Comedy 19.00-20.45 | E6 Soap 21.00-22.15 |
| | A4 News 20.50-21.00 | B5 News 19.45-20.15 | C6 Talkshow 21.30-22.30 | D5 Show 20.45-22.00 | E7 Popmusic 22.15-23.00 |

METHOD AND DEVICE FOR ON-SCREEN DISPLAY OF PROGRAM INFORMATION AND MEANS COMPRISING CODE FOR PERFORMING SUCH A METHOD

BACKGROUND OF THE INVENTION

1. Field of the Invention

This invention relates to a method and device for on-screen display of program information in a grid of cells comprising first type cell rows in one dimension and second type cell rows in another dimension, wherein the cells in each of said first kind cell rows are adapted to display information on programs from a particular program-provider in sequential order of time, the method further comprising the generation of a user-controlled cursor to point to a particular cell of the grid.

2. Description of the Related Art

Such method and device for the on-screen display of program information is disclosed in U.S. pat. No. 5,479,268. The main purpose of the method of this prior art document is to present to the user a complete on-screen review of the TV-programs which he is able to receive from a plurality of TV-channels during a period of, e.g., one full day. With this method, the user may scan the grid by means of a cursor, point the cursor to a particular TV-program and subsequently, select that particular program for receiving and viewing and/or recording that program. Usually, the grid will be much larger than the screen and then the cursor presents a convenient tool to scroll the grid with the TV-program information across the screen in either or both of the two dimensions in a manner similar to the well-known scrolling of spreadsheets on the screen of a monitor in computer technology.

In the above referenced document, the horizontal cell-rows are each displaying information on the programs of a particular TV-channel and the vertical cell rows (the columns) display the TV-programs which are transmitted by the plurality of TV-channels during a time slot of predetermined duration (e.g., one half hour). Therefore, the user may easily scan the TV-programs of a particular TV-channel by scanning the cursor along a horizontal cell row and he may easily scan the TV-programs transmitted during a particular time slot by scanning the cursor along a vertical cell row.

A drawback of the prior art method, however is, that the duration of the programs is usually not equal to the duration of the time slot. Therefore, in the prior art document, a program of one hour necessarily occupies two cells of a horizontal row and a program of one and a half-hour occupies three cells, etc. More particularly, in the prior art document, the information of a one and a half-hour program is contained in a first cell and the next two cells are kept blank.

A further drawback occurs when a TV-program lasts less then the predetermined time slot. For instance news-programs may often last only ten minutes or one quarter of an hour. Then one cell should contain the information of e.g., two programs. This is not well possible because the cell is usually too small to contain the information of more than one program. Moreover, then it is not possible to select a particular program for reception or recording by merely selecting its cell. A solution for this second drawback may be found in making the predetermined time slot shorter, e.g.,one quarter of an hour, however,this would, of course, double the size of the grid with much more blank cells for the programs of larger duration than one quarter of an hour.

SUMMARY OF THE INVENTION

The present invention seeks to overcome the aforementioned drawbacks of the prior art method. The method of the invention is therefore characterized in that, under control of the cursor, the program information contained in one or more first type cell rows is shifted with respect to the program information contained in the first type cell row to which said particular cell belongs so as to improve the time alignment of the program information displayed in the second type cell row to which said particular cell belongs. The invention is based on the recognition of the fact that it is not necessary to time-align the program information in all the second type-cell-rows of the grid simultaneously. It is sufficient that only the second type cell-row to which the cursor points, is time aligned. When the user is interested in the program transmitted during another time slot he/she can simply replace the cursor to a program transmitted during that time slot (preferably the program of the same channel, i.e. on the same first type cell row) and he/she will find the programs in that cell-row being properly time-aligned. With the method of the invention, each cell can be filled with the information of one program and of only one program, irrespective of the duration of the programs.

The time-alignment may, e.g., be achieved by shifting the programs as a result of comparing the start time of the program pointed to by the cursor with the start and stop times of the programs in the other first type cell rows. This method however, results in a relatively poor time-alignment when the duration of the program pointed to by the cursor is large. The time-alignment may be improved when the method according to the invention is characterized in that the program information contained in one or more first type cell rows is shifted with respect to the program information contained in the first type cell row to which said particular cell belongs as a result of comparing the start and stop times of the programs in said one or more first type cell rows with the current time, when the current time falls between the start and stop times of the program pointed to by the cursor.

The method according to the invention may be additionally characterized by at least one additional on-screen button (Now) for shifting the program information in one or more first type cell rows so as to improve the time alignment of the program information displayed in one of the second type cell rows with the current time. This function may be activated by pointing the cursor to this additional button and it allows the user to view, at a glance in said one second type cell row, the programs which are actually transmitted.

In the above referenced prior art document and in the description of the present application, the programs displayed are TV-programs transmitted by a plurality of TV-program providers. However, the method of the present invention may also be used for other purposes in which program information is on-screen displayed, for instance an internet site may display information on a plurality of conference-sessions in a grid of cells, wherein the cells of each first type cell row display information on sessions organized by a particular conference-provider or in a particular conference center in time-sequential order of the time in which the sessions are held. The user may point the cursor to a particular cell and select that cell when he is interested to receive more detailed information on the conference displayed in that cell.

BRIEF DESCRIPTION OF THE DRAWINGS

The invention will be further clarified with reference to the accompanying drawing in which:

FIGS. 1a and 1b shows screen dumps of the results of the method according to the invention.

DESCRIPTION OF THE PREFERRED EMBODIMENTS

Figure 2:
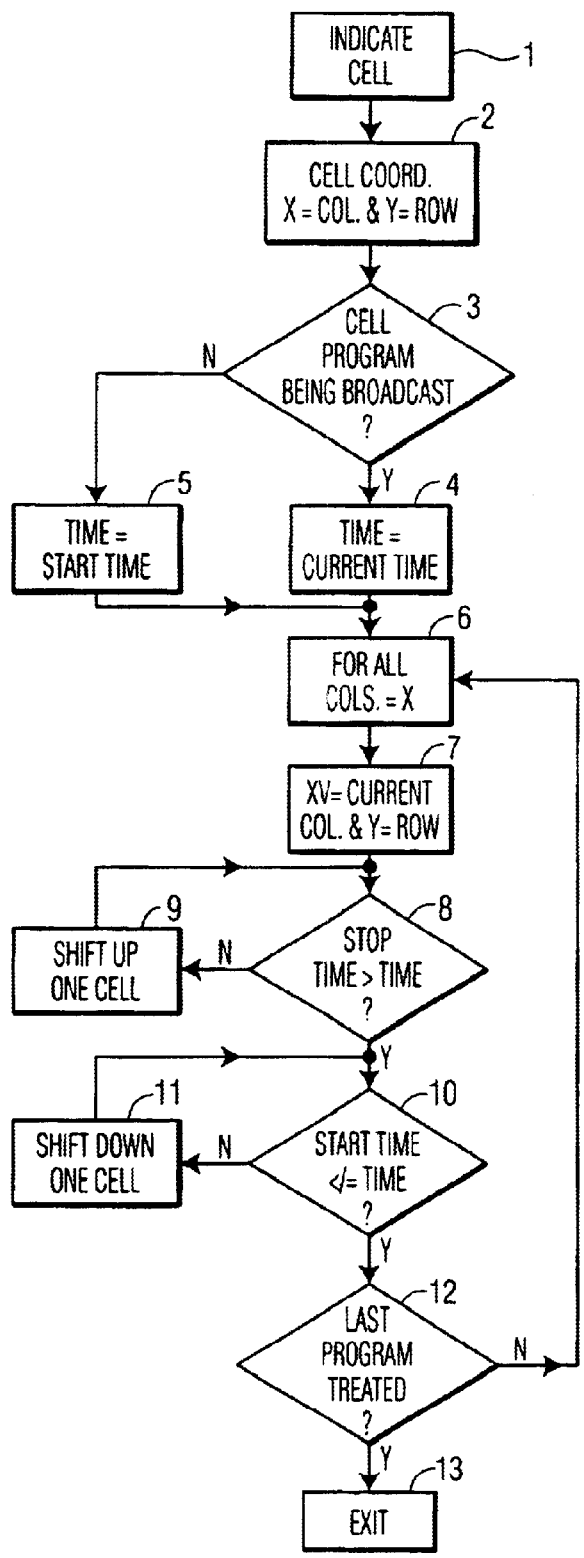
FIG. 2 shows a flowchart of a program-code which may be used to carry out the method according to the invention.

FIG. 1a represents, on a screen of a picture display, a grid of cells arranged in vertical columns and horizontal rows.

Each cell displays information about a particular TV-program. The display shows the kind of the program (news, quiz, talk show, etc.), as well as the beginning and the end of the scheduled transmission time. Usually, the cell will also display the title of the program, however, for easy reference in this description, the cells on the screen of FIG. 1a show, instead of the title, a program identification code A1, A2, . . . , E5. Each column of the grid shows the programs which are provided by a particular program provider (ARD, ZDF, . . . , etc.) and these programs are displayed in time sequence, i.e., in case of TV-programs, in the sequence of their transmission times and, in case of conference sessions, in the sequence of the session-times. Thus, the programs A1 . . . A5 are all provided by the same program provider (e.g., broadcaster) and the program A2 is provided after program A1 and before program A3, etc.

In FIG. 1a, the cell with the program B2 has a thick contour. This contour represents a cursor, which is controlled by the user, e.g., by means of a mouse or by means of arrow-buttons on a remote-control unit. In FIG. 1a, the cursor points to the program B2. If the cursor is positioned by arrow buttons, the user may subsequently select the program B2 for reception or for recording by pressing, e.g., an OK-button on his remote-control unit. If the cursor is mouse-controlled, the cursor may preferably be positioned by moving the mouse to a cell and the program on which the mouse is then positioned may subsequently be selected for reception and/or for recording by clicking on a mouse-button. These techniques are well known in computer technology.

Usually, the number of programs, provided by the program providers during, e.g., a full day, is too large to be conveniently displayed on a single screen. As it is already remarked in the preamble of this application, the cursor can also be used to scroll the programs across the screen, e.g., by moving the cursor to one of the boundaries of the grid.

As can be seen from FIG. 1a, the programs displayed in the second row of the grid, that is, the row in which the cursor is positioned, are time aligned with each other, in the sense that the start time of the "cursored" program B2 is equal to or later than the start time and earlier than the stop time of all other programs (A2, C2, D2, E2) in said second row. This time alignment is not present in the other rows of the grid, due to the fact that the programs displayed in the grid have largely different durations. Some of the programs last only 10 minutes (A4, C3, E3) whereas others may last 2 hours or more (A3, E5).

FIG. 1b shows the result of a deplacement of the cursor from the cell-displaying program B2 to the cell-displaying program B3. The display of the programs in the second column (ZDF), in which the cursor is displayed, is unchanged. However, the programs in the first column (ARD) are shifted downwards over one cell, whereby a new program A0 has appeared on screen and program A5 has disappeared from the screen. The programs of the third column (Ned1) have shifted one cell upwards whereby a new program C6 has appeared on screen and program C1 has disappeared. The forth column (BBC1) has remained unchanged but the fifth column (BBC2) has shifted two cells upwards,whereby the programs E1 and E2 have disappeared and programs E6 and E7 have appeared on screen. By virtue of these shifts, the time-alignment in the row to which the "cursored" cell belongs (now the 3rd row of the grid) has been regained. Again the start time (18.30 h) of the "cursored" program is equal to or later than the start time and earlier than the stop time of all other programs of the 3rd row (A2, C4, D3, E5)

It has to be observed that the time-alignment may be differently defined, e.g., so that the start time of all other programs of the "cursored" row is equal to or later than the start time and earlier than the stop time of the "cursored" program, or alternatively, so that the absolute value of the difference between the start time of the "cursored" program and the start time of each other program in the "cursored" row is the smallest possible.

The flowchart of FIG. 2 contains a number of program-steps 1 to 12, which may, e.g., be carried out by a microprocessor. These steps have the following functions:

Step 1: A particular cell is pointed to by the cursor.

Step 2: X=the column of the pointed cell. Y=the row of the pointed cell.

Step 3: A decision step which determines whether the program in the pointed cell is currently broadcasted.

Step 4: If the result of step 3 is YES: TIME=the current time.

Step 5: If the result of step 3 is NO: TIME=the start time of the program in the pointed cell.

Step 6: For all visible program columns ≠X, the next steps 7 to 12 are repeated. Step 7: XV=the program column considered. The start and stop times of the program in cell XV,Y (i.e.,the cell in column XV and in the same row as the pointed cell) is read out.

Step 8: A decision step which determines whether the stop time of the program in cell XV,Y>TIME. If the result is NO, the process proceeds with step 9. If the result is YES, the process proceeds with step 10.

Step 9: All programs of column XV are shifted one cell upwards and the process returns to step 8.

Step 10: A decision step which determines whether the start time of the program in cell XV,Y≦TIME. If the result is NO, the process proceeds with step 11. If the result is YES, the process proceeds with step 12.

Step 11: All programs of column XV are shifted one cell downwards and the process returns to step 10.

step 12: A decision step which determines whether the last visible program column≠X has been treated. If the result is NO, the process returns to step 6. If the result is YES, the process waits for a new action of the cursor by the user.

In the flowchart of FIG. 2, the steps 3 and 4 are included to implement that, when the "cursored" program is currently broadcasted, instead of the start time of this program, the current time is taken as a reference for the time alignment. The reason for this has been explained in the introductory part to this application.

The screens shown in FIGS. 1a and 1b display a column "Now". The user may position the cursor to any one cell of this column in order to time-align all the programs in the neighboring row of cells with the current time. For instance, when the user points the cursor to the third cell of the "Now"-column, the programs in the other columns are shifted upwardly or downwardly so that all the programs in the third row have a start time prior to and a stop time later than the current time. This enables the user to have a quick view on the programs which are currently "on the air". The implementation of this feature in the flowchart of FIG. 2 can be done when the result of step 3 is made to be "YES" if the program in the pointed cell is currently broadcasted OR if the column of the pointed cell (X) is the "Now"-column. The "Now"-column may be replaced by a single "Now"-button, so that when this button is pointed to by the cursor, the programs in, e.g., the first or the second cell-row are time-aligned with the current time. With the "Now"-column of FIGS. 1a and 1b, the user has the ability to select in which row he wants the time-alignment to take place.

It will be apparent that the screens of FIGS. 1a and 1b and the flowchart of FIG. 2 are merely examples of the present invention. Many alternatives may be made in the embodiments shown. For instance, if, for reasons of economy, only the start times of the programs are known, then the start-time of the next program could be considered as the stop time of the previous program and, consequently, the computer-program has to read both cells before it can decide on a shift of programs in a column.

What is claimed is:

1. A method for on-screen display of program information in a grid of cells comprising first type cell rows in one dimension and second type cell rows in another dimension, wherein the cells in each of said first type cell rows display information on programs from a particular program-provider in sequential order of time, the method further comprising generating a user-controlled cursor to point to a particular cell of the grid, characterized in that the method further comprises the step:

shifting, under control of the cursor, the program information contained in one or more first type cell rows with respect to the program information contained in the first type cell row containing said particular cell so as to improve the time alignment of the program information displayed in the second type cell row containing said particular cell.

2. The method as claimed in claim 1, characterized in that said shifting step comprises the steps:

comparing the start and stop times of the programs in said one or more first type cell rows with the current time; and shifting the program information contained in one or more first type cell rows with respect to the program information contained in the first type cell row containing said particular cell, when the current time falls between the start and stop times of the program pointed to by the cursor.

3. The method as claimed in claim 1, characterized in that said method further comprises providing at least one additional on-screen button to the grid for shifting the program information in one or more first type cell rows so as to improve the time alignment of the program information displayed in one of the second type cell rows with the current time.

4. Means comprising program code for performing a method as claimed in claim 1.

5. A program display device comprising means for on-screen displaying program information in a grid of cells comprising first type cell rows in one dimension and second type cell rows in another dimension, wherein the cells in each of said first type cell rows display information on programs from a particular program provider in sequential order of time, the device further comprising means for generating a user-controlled cursor to point to a particular cell of the grid, characterized in that, under control of the cursor, the program information contained in one or more first type cell rows is shifted with respect to the program information contained in the first type cell row containing said particular cell so as to improve the time alignment of the program information displayed in the second type cell row containing said particular cell.

6. The program display device as claimed in claim 5, characterized in that the program display device comprises means for comparing the start and stop times of the programs in said one or more first type cell rows with the current time, wherein the program information contained in one or more first type cell rows is shifted with respect to the program information contained in the first type cell row containing said particular cell, when the current time falls between the start and stop times of the program pointed to by the cursor.

7. The program display device as claimed in claim 6, characterized in that said grid comprises at least one additional on-screen button for shifting the program information in one or more first type cell rows so as to improve the time alignment of the program information displayed in one of the second type cell rows with the current time.

* * * * *